United States Patent
Myers et al.

(10) Patent No.: US 8,719,812 B1
(45) Date of Patent: May 6, 2014

(54) METHODS, SYSTEMS, AND COMPUTER READABLE MEDIA FOR DYNAMICALLY MODIFYING AND UTILIZING A SOFTWARE PACKAGE DESCRIPTION FOR SOFTWARE INSTALLATION

(75) Inventors: Brandon Myers, Cary, NC (US); Eric Vook, Durham, NC (US); Victor Kan, Morrisville, NC (US)

(73) Assignee: EMC Corporation, Hopkinton, MA (US)

( * ) Notice: Subject to any disclaimer, the term of this patent is extended or adjusted under 35 U.S.C. 154(b) by 987 days.

(21) Appl. No.: 12/165,001

(22) Filed: Jun. 30, 2008

(51) Int. Cl.
*G06F 9/445* (2006.01)

(52) U.S. Cl.
USPC ............ 717/174; 717/175; 717/177; 717/178

(58) Field of Classification Search
USPC .................................................. 717/168–178
See application file for complete search history.

(56) References Cited

U.S. PATENT DOCUMENTS

| | | | | |
|---|---|---|---|---|
| 6,370,539 B1 * | 4/2002 | Ashby et al. | ................... | 701/532 |
| 6,385,766 B1 * | 5/2002 | Doran et al. | ................... | 717/174 |
| 6,675,382 B1 * | 1/2004 | Foster | ........................... | 717/177 |
| 6,738,970 B1 * | 5/2004 | Kruger et al. | .................. | 717/175 |
| 6,922,722 B1 * | 7/2005 | Mann et al. | ................... | 709/220 |
| 7,000,230 B1 * | 2/2006 | Murray et al. | ................ | 717/172 |
| 7,464,374 B2 * | 12/2008 | Latten et al. | ................... | 717/125 |
| 7,530,065 B1 * | 5/2009 | Ciudad et al. | .................. | 717/174 |
| 7,546,596 B2 * | 6/2009 | Needham | ....................... | 717/169 |
| 2003/0208473 A1 * | 11/2003 | Lennon | .............................. | 707/3 |
| 2004/0117338 A1 * | 6/2004 | Kennedy et al. | ................... | 707/1 |
| 2005/0015761 A1 * | 1/2005 | Chang et al. | .................. | 717/174 |
| 2005/0273779 A1 * | 12/2005 | Cheng et al. | .................. | 717/168 |
| 2006/0041879 A1 * | 2/2006 | Bower et al. | ................... | 717/162 |
| 2006/0282480 A1 * | 12/2006 | Johnson et al. | .............. | 707/203 |
| 2007/0101197 A1 * | 5/2007 | Moore et al. | ..................... | 714/38 |
| 2007/0234312 A1 * | 10/2007 | Shepard et al. | ............... | 717/136 |
| 2008/0127171 A1 * | 5/2008 | Tarassov | ....................... | 717/174 |
| 2008/0127175 A1 * | 5/2008 | Naranjo et al. | ............... | 717/174 |
| 2009/0193409 A1 * | 7/2009 | Dave et al. | ..................... | 717/173 |
| 2009/0249277 A1 * | 10/2009 | Prakash | ........................ | 717/100 |

OTHER PUBLICATIONS

Dynamic Upgrade of Distributed Software Components by Von et al. Jan. 26, 2004.*

* cited by examiner

*Primary Examiner* — Lewis A Bullock, Jr.
*Assistant Examiner* — Tina Huynh
(74) *Attorney, Agent, or Firm* — Jenkins, Wilson, Taylor & Hunt, P.A.

(57) ABSTRACT

Methods, systems, and computer readable media for dynamically modifying and utilizing a software package description for software installation are disclosed. According to one method, a software package that includes a software description file is loaded on a hardware platform. The software description file is dynamically modified based on the software package and the hardware platform. The method also includes utilizing the modified software description file to install the software package on the hardware platform.

11 Claims, 9 Drawing Sheets

```
# Big Platform Data
ATTRIBUTE MaximumCacheSize 100000       } 502
ATTRIBUTE PlatformName BigTier

# Middle Platform Data
ATTRIBUTE MaximumCacheSize 5000
ATTRIBUTE BigTierUpgradePERMIT 1         } 504
ATTRIBUTE PlatformName MiddleTier

# Small Platform Data
ATTRIBUTE MaximumCacheSize 2500
ATTRIBUTE MiddleTierUpgradePERMIT 1
ATTRIBUTE BigTierUpgradePERMIT 1         } 506
ATTRIBUTE PlatformName SmallTier
```

FIG. 5A

```
my $TOC_data_href =
{
    'platform=big' => <<end_of_big_platform

ATTRIBUTE MaximunCacheSize 100000
ATTRIBUTE PlatformName BigTier end_of_big_platform
,
    'platform=middle' => <<end_of_middle_platform ATTRIBUTE MaximunCacheSize 5000
ATTRIBUTE BigTierUpgradePERMIT 1
ATTRIBUTE PlatformName MiddleTier end_of_middle_platform
,
    'platform=small' => <<end_of_small_platform ATTRIBUTE MaximumCacheSize 2500
ATTRIBUTE MiddleTierUpgradePERMIT 1
ATTRIBUTE BigTierUpgradePERMIT 1
ATTRIBUTE PlatformName SmallTier end_of_small_platform
,
};
```

METHODS, SYSTEMS, AND COMPUTER READABLE MEDIA FOR DYNAMICALLY MODIFYING AND UTILIZING A SOFTWARE PACKAGE DESCRIPTION FOR SOFTWARE INSTALLATION

TECHNICAL FIELD

The subject matter described herein relates to installing software packages. More particularly, the subject matter described herein relates to methods, systems, and computer program products for dynamically modifying and utilizing a software package description for software installation.

BACKGROUND

At present, network environments comprising hardware platform machines execute software applications to perform various network functions, such as data management and storage. After the initial installation, a software application may require an update or revision in order to remedy any existing software errors or to increase, update, or otherwise change the hardware platform's performance. Thus, an updated version of the installed software application must be generated by the software provider and deployed to hardware platforms on a regular basis. Even though a new revision of software is required, there may be a need for multiple versions of the revision. That is, a "general" version of the software may need to be uniquely configured for each type of hardware platform that utilizes the particular software application. More specifically, each type of hardware platform running in the network environment may be characterized as a certain "platform class" depending on any number factors and exhibited characteristics, such as memory size or processing power.

In order to accommodate the various classes of hardware platforms, a software provider may produce software updates that are customized for each hardware platform class. For example, a typical software update is embodied as a software package, which may include a number of files, such as updated software drivers and a software description file. The software description file is a text file that includes, among other things, the revision levels and attributes that characterize the updated software drivers. Namely, a hardware platform utilizes the software description file to manage the overall installation process of the software package. As a result, the software description must also be uniquely generated in order to properly reflect each of the customized software packages.

Although this approach of customizing software packages and software description files addresses the needs of the numerous types of hardware platforms known to be running the software provider's product, it may not be the most economically feasible and practical solution for installing software updates. In addition to the significant amount of resources expended, which are associated with programming and compiling each software update, each software description file must be manually updated to reflect the attributes of the software packages.

Accordingly, there exists a need for methods, systems, and computer program products for dynamically modifying a software package description.

SUMMARY

Methods, systems, and computer readable media for dynamically modifying and utilizing a software package description for software installation are disclosed. According to one method, a software package that includes a software description file is loaded on a hardware platform. The software description file is dynamically modified based on the software package and the hardware platform. The method also includes utilizing the modified software description file to install the software package on the hardware platform.

The subject matter described herein for dynamically modifying a software package description may be implemented using a non-transitory computer readable medium having stored thereon computer executable instructions that when executed by the processor of a computer perform steps of the aforementioned method (see above). Exemplary non-transitory computer readable media suitable for implementing the subject matter described herein include disk memory devices, programmable logic devices, and application specific integrated circuits. In one implementation, the non-transitory computer readable medium may include a memory accessible by a processor. The memory may include instructions executable by the processor for implementing any of the methods for dynamically modifying and utilizing a software package description described herein. In addition, a non-transitory computer readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

According to one embodiment, the subject matter described herein includes methods, systems, and computer readable media for dynamically modifying and utilizing a software package description for software installation. For example, the present subject matter may be used to dynamically modify a description of a software package based on the type of hardware platform that the software package is being installed. In one embodiment, the software package description includes a table of contents (TOC) that is embodied as a text file (e.g., TOC.txt file) that contains attribute and property information related to the associated software package. The attributes and properties may include various types of information, such as name, revision, cache size requirement, component revision levels, requirement for reboot upon installation, and the like. The data contained in the TOC file is important since it provides the software installer application with information that is needed to make certain operating decisions during the installation process.

Figure 1:
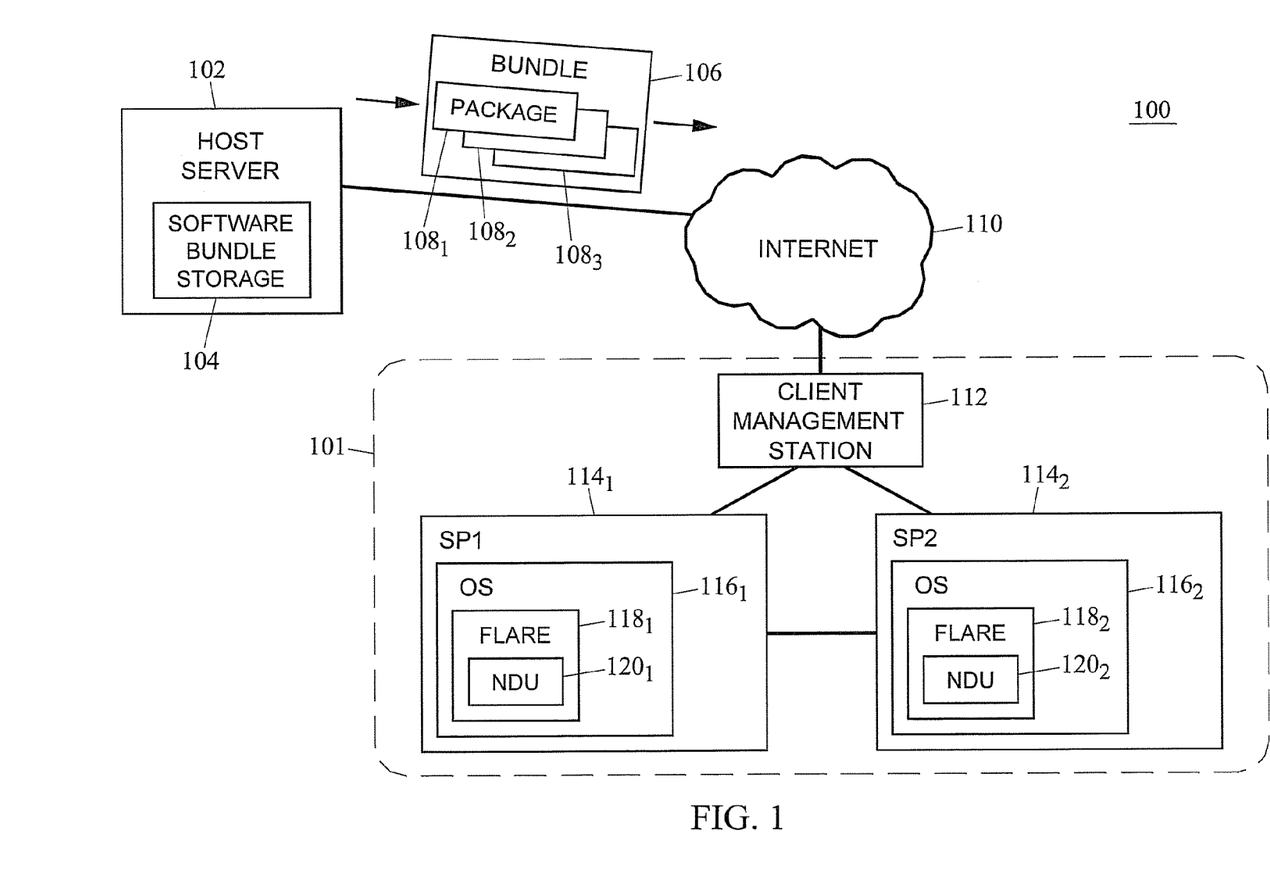
FIG. 1 is a block diagram illustrating an exemplary system for delivering a software package according to an embodiment of the subject matter described herein.

FIG. 1 depicts a block diagram that illustrates an exemplary system 100 for delivering a software package to a particular computer platform. For example, system 100 includes a client network 101 that comprises a client management station 112 and two data storage processors $114_1$ and $114_2$. Data storage processors, such as processors $114_1$ and $114_2$, are typically found in pairs for redundancy and/or load sharing purposes. Although only three network elements are shown, additional components may be also located in client network 101. Similarly, additional client networks, other than just client network 101, may exist in system 100. As shown in FIG. 1, each storage processor 114 includes an operating system (OS) 116. In one embodiment, OS 116 may include several components which assist in the functioning and operation of storage processor 114. For instance, OS 116 may include a Flare computing environment application (i.e., Flare 118), which assists with the data storage operations performed by storage processor 114. Occasionally, software such as the Flare 118 requires updating in order to optimally perform or accommodate new hardware and software components installed in storage processor 114. For example, updating may be required if a network operator desires storage processors 114 to utilize recent revisions of Flare 118, or recent revisions of specific driver components utilized by Flare 118.

In one embodiment, storage processor $114_1$ (which may be designated as the "primary" storage processor in a redundancy configuration) may obtain updates by downloading revised software from a host server (e.g., host server 102) that is associated with the original producer of the software program to be updated. For example, host server 102 may be configured to maintain a plurality of software bundles containing software updates in software bundle storage area 104. As used herein, the term "software bundle" is defined as a collection of software packages bundled together for convenient delivery (e.g., download) to a client's machine. Similarly, a "software package" is a grouping of software drivers, programs, or files that are intended to update a software program (e.g., Flare 118) running on a client computer, such as storage processor 114. Software bundle storage area 104 may be embodied by any data storage means used to store various versions of software bundles that are accessible to client machines. In one embodiment, storage area 104 may contain various software bundles containing different versions of Flare software package updates that may be accessed for download by a client.

Figure 2:
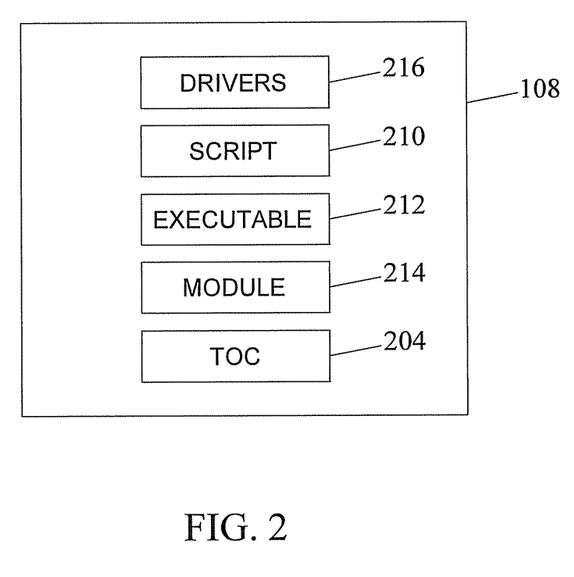
FIG. 2 is a block diagram illustrating the contents of an exemplary software package according to an embodiment of the subject matter described herein.

An exemplary software package 108 is depicted in FIG. 2. The contents of software package 108 may include software, settings, and checks. These contents may be different for different revisions. As used herein, the term "revision" describes one particular instance of a package that has particular attributes, which may or may not differ from the previous or other earlier revisions. In one embodiment, software package 108 may comprise a plurality of individual files such as the updated software drivers 216, a script file 210, an executable file 212, a script module 214, and a software description file, (e.g., table of contents (TOC) file 204). As shown in FIG. 2, TOC file 204 may only include metadata that does not change with the class of hardware platform. The data in TOC file 204 (at this stage) is primarily fixed for reasons such as assisting with installing applications that require backwards compatibility. Notably, script file 210, executable file 212, and script module 214 are files in the software package that are used to during the loading process to modify the TOC file 204 prior to the completion of installation of drivers 216. It should be understood that the contents of software package 108 is not limited to only the aforementioned files.

Returning to FIG. 1, a software bundle 106 is sent from host server 102 to client network 101 (via Internet 110 or some other communications network). In one embodiment, software bundle 106, which contains a plurality of software packages $108_1 \ldots {}_3$, is sent to storage processor $114_1$ in response to a request by client network 101 (e.g., by storage processor $114_1$ itself or some network operator node). Once received by storage processor $114_1$, each software package in software bundle 106 may be loaded onto storage processor $114_2$ (which may be functioning as the "secondary" storage processor) by storage processor $114_1$. Alternatively, software bundle may be delivered directly to the secondary data storage processor $114_2$.

Figure 3A:
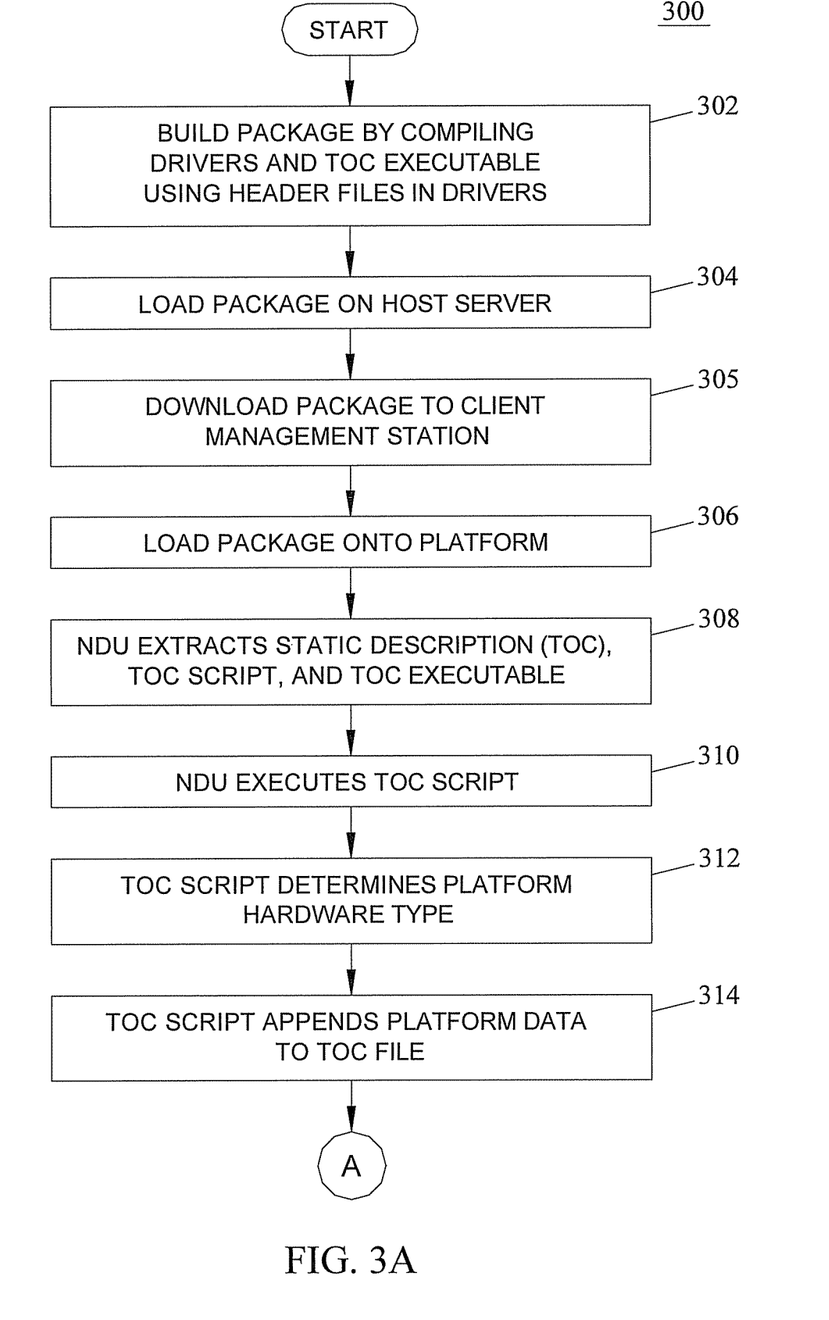
FIG. 3 is a flow chart illustrating the exemplary steps for dynamically modifying and utilizing a software package description according to an embodiment of the subject matter described herein.
Figure 3B:
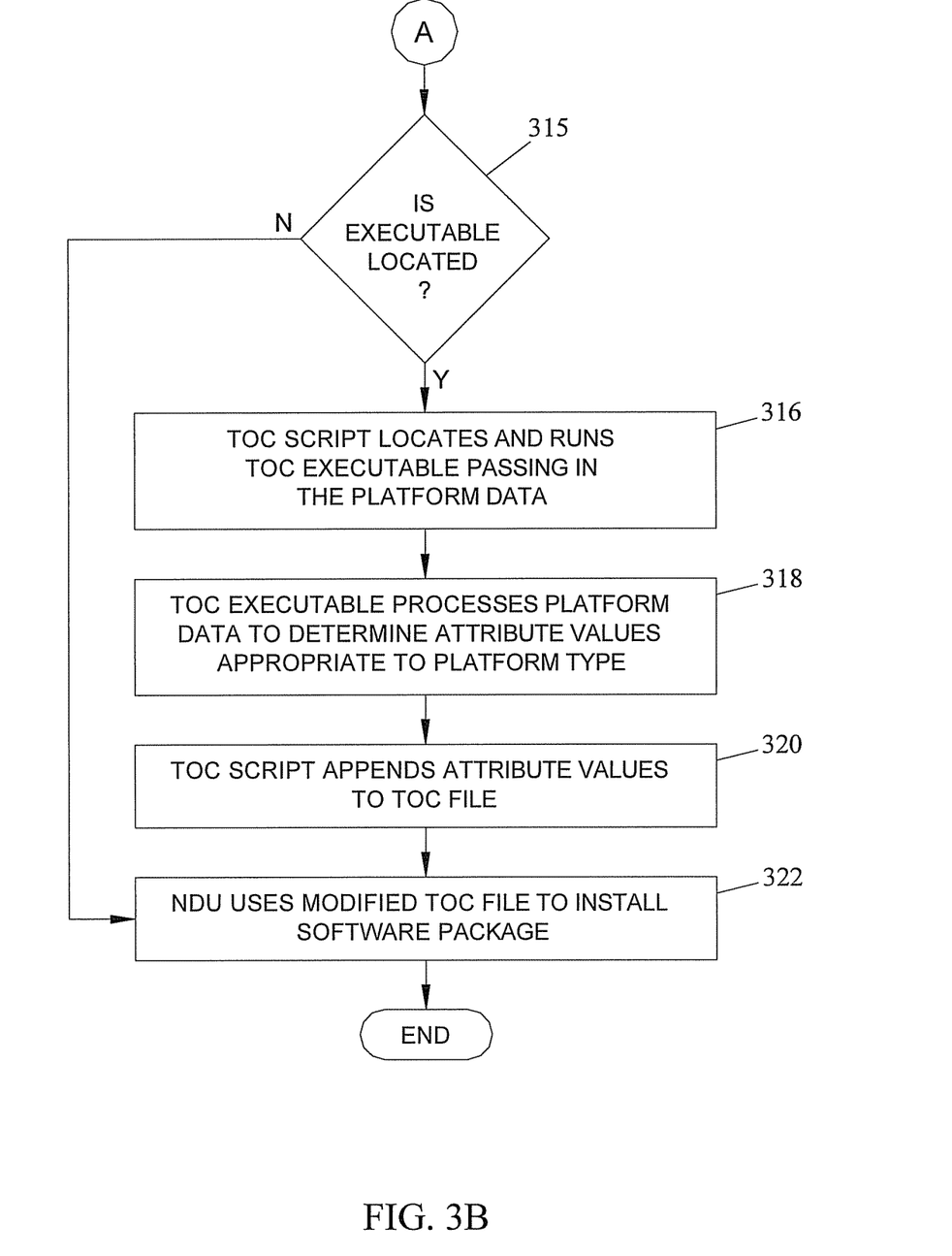

Prior to being fully installed, each software package 108 and the existing software on storage processor $114_2$ interact in order to dynamically modify TOC file 204 that is ultimately used to manage the software driver installation process. FIG. 3 is a flow diagram depicting an exemplary method 300 for generating a TOC file and for dynamically modifying a TOC file associated with the software package.

Figure 4:
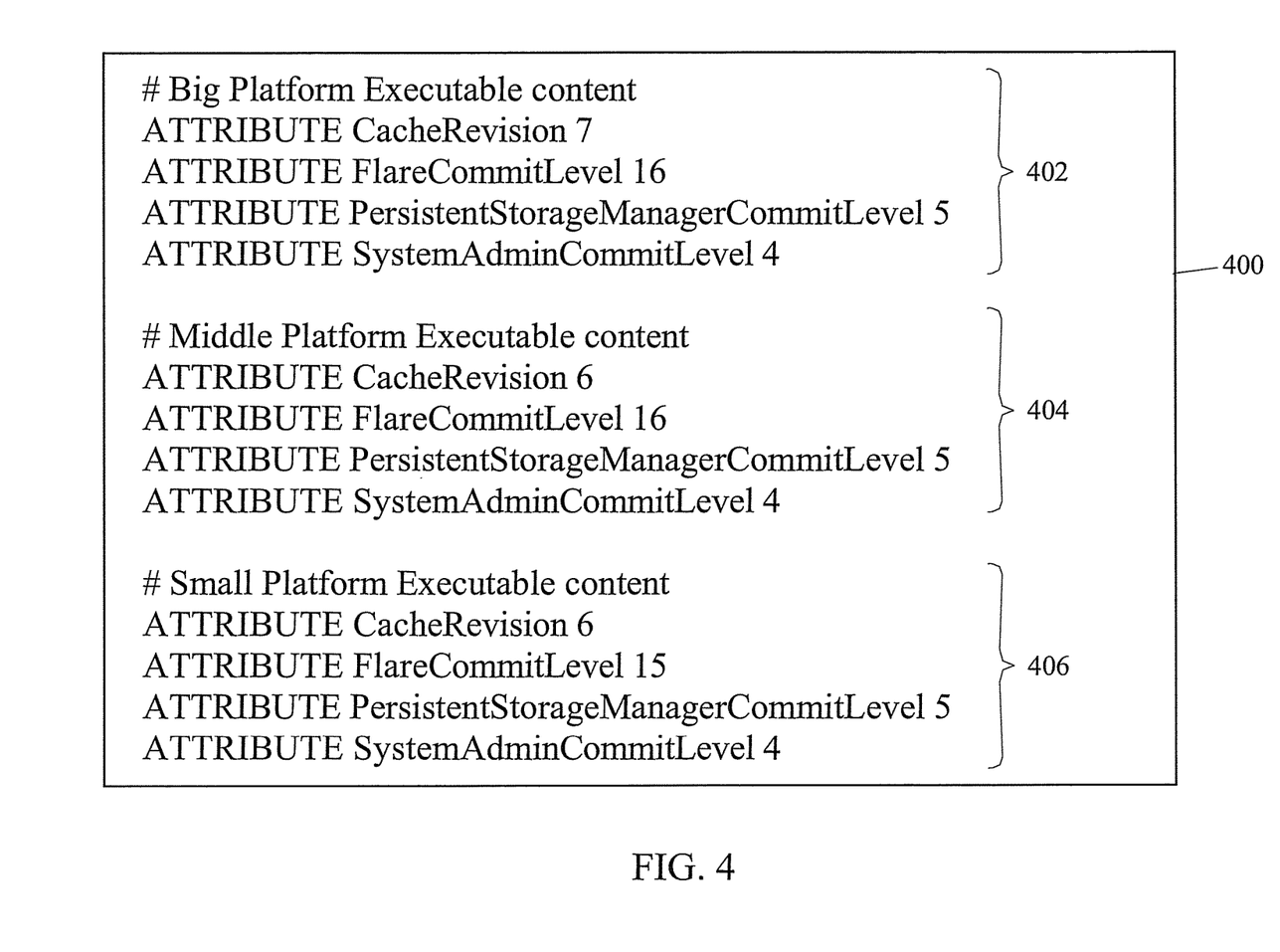
FIG. 4 depicts an exemplary data structure containing executable content data used to modify a software package description according to an embodiment of the subject matter described herein.

In block 302, a software package is built. In one embodiment, a build environment is used to generate a software package that includes a plurality of drivers for updating software applications installed on a client machine (e.g., storage processor 114). The software drivers and an executable file may be compiled at the build environment using header files. In one embodiment, the build environment includes a directory of common header files, a directory of the executable source code, and a directory for each driver's source code. When a driver is built, the common header files and the source code for the desired driver are used. Similarly, when the executable is built, the common header files and the source for the executable are used. The header files may comprise a piece of source code that contains values that are used repeatedly throughout the software drivers. By compiling drivers and the executable using the header files, a variable executable content data structure is created within the executable. Notably, the variable executable content data structure contains various attribute sections for various classes of hardware platforms. In FIG. 4, an exemplary variable executable content data structure 400 is shown to include attribute sections 402-406. Specifically, section 402 contains attribute information (e.g., cache revision level, Flare commit level, and the like) for data processors that may be classified as a "big platform." Similarly, sections 404 and 406 contain attribute information for data processors that may be classified as "middle platforms" and "small platforms," respectively. Namely, each section contains executable attribute information that varies depending on the type of platform the software package is installed on. For example, section 402 depicts that a large platform requires a cache revision level equal to 7, but sections 404 and 406 indicate that only a cache revision level of 6 is required for a middle and small platform (i.e., in order to support this particular software package). In another example, the Flare commit level indicated in sections 402-406 also differs depending on the platform size that receives the software package. In an alternate embodiment, variable executable content data structure 400 may be embodied as a separate text file that may be included as an additional file in the software package.

Figure 5A:
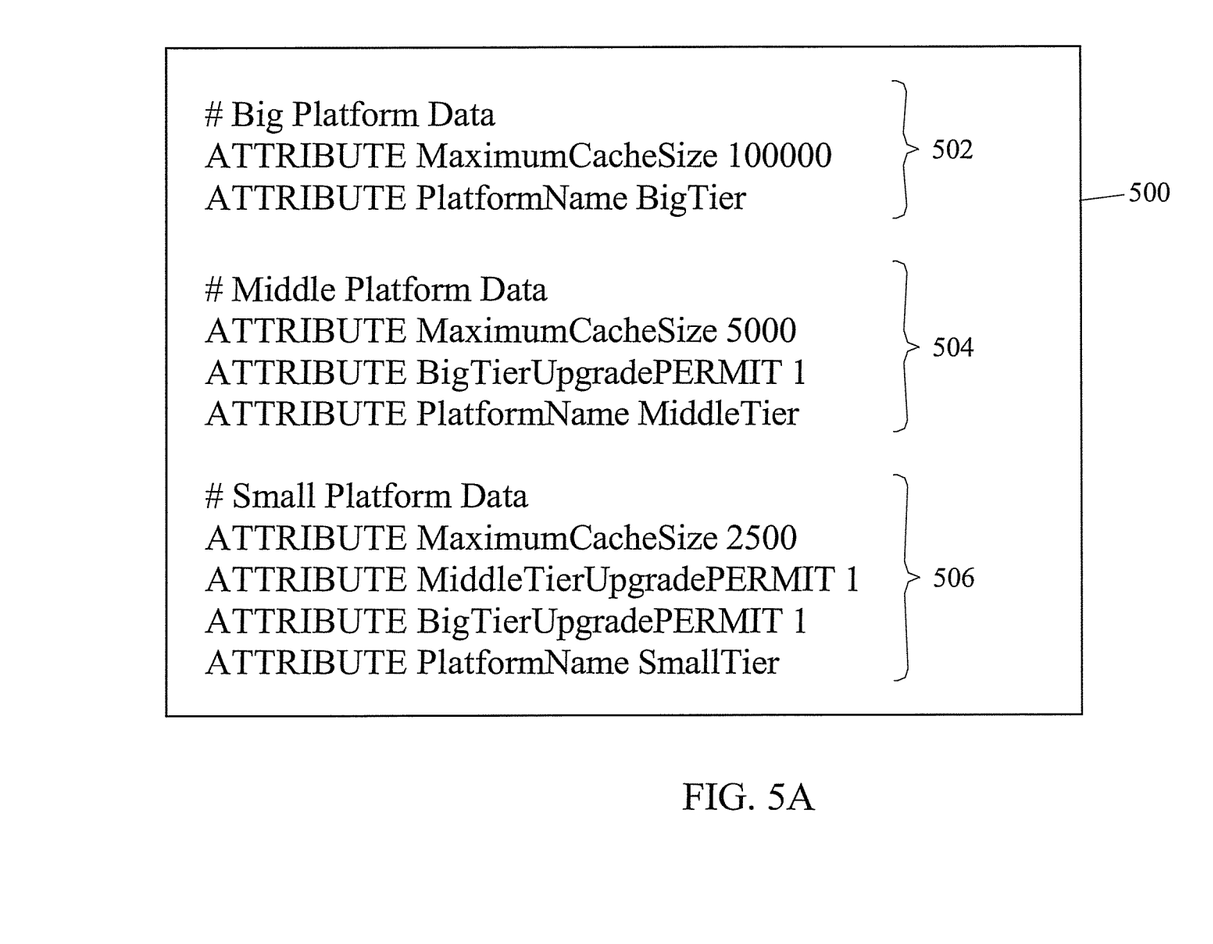
FIG. 5A depicts an exemplary data file containing variable platform data used to modify a software package description according to an embodiment of the subject matter described herein.
Figure 5B:
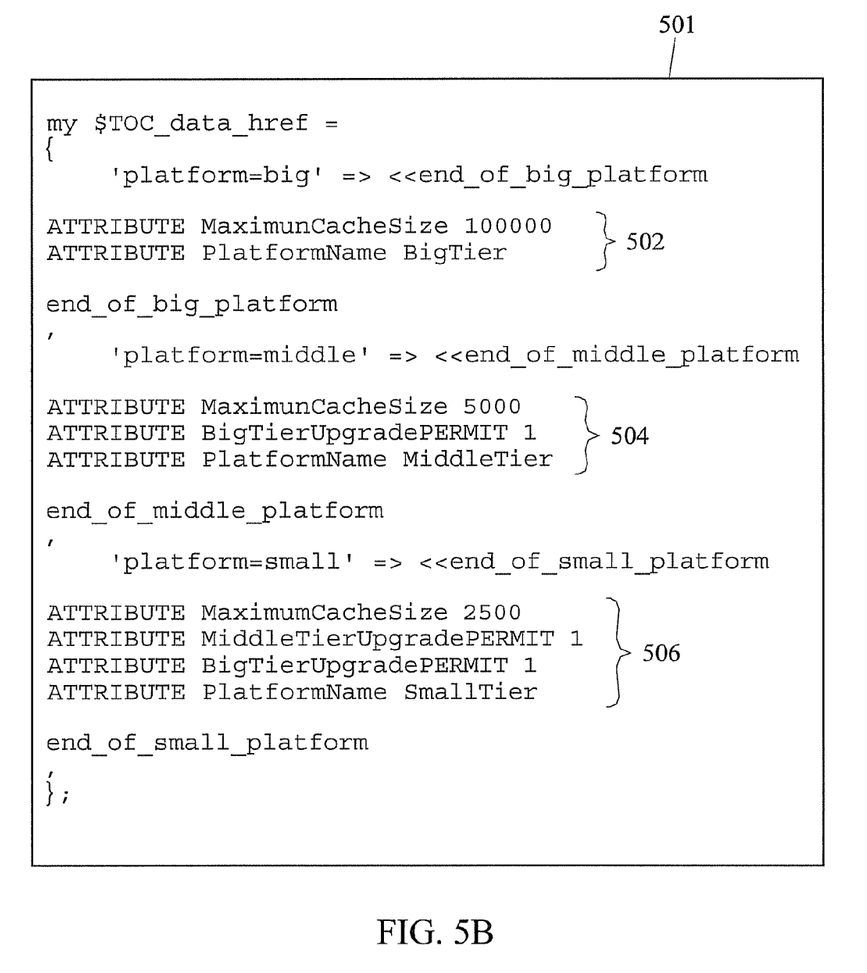
FIG. 5B depicts an exemplary data structure containing variable platform data used to modify a software package description according to an embodiment of the subject matter described herein.

Once this compilation process is completed, a second data structure is also created for the software package. Namely, a variable platform description data structure, is generated by programmers to include platform attribute information for all types of hardware platform classes. For example, FIG. 5A depicts an exemplary variable data file 500 that includes three separate attribute sections 502-506 corresponding to three "classification types." For example, section 502 contains predefined attribute data that is needed for software updates performed on a big platform, section 504 contains predefined attribute data that is needed for software updates performed on a middle platform, and section 506 contains predefined attribute data that is needed for software updates performed on a small platform. Although only three classes of platforms are shown in FIG. 5A, any number of platform classes with any number of attributes (per class) may be included in file 500 without departing from the scope of the present subject matter. Furthermore, file 500 may exist as a separate text file to be included in the software package for future reference by script file 210 or alternatively, it may be embodied as a data structure within script file 210 as shown in FIG. 5B. For example, FIG. 5B depicts a data structure 501 that is incorporated in a script file (e.g., a perl script file) that also includes sections 502-506, which is the same attribute information contained in file 500. Notably, a software package may include either file 500 or data structure 501 without departing from the scope of the present subject matter.

Returning to FIG. 3, the software package is loaded on a host server in block 304. In one embodiment, after the software package is created, tested and finalized, the package grouped in a bundle which is stored in storage area 104 on host server 102. For example, software package 108 may be grouped with other software packages to form a software bundle 106 that may be downloaded by a client machine.

In block 305, the software package is downloaded to the client network. In one embodiment, client management station 112 begins downloading a requested software bundle after accessing host server 102 and making a request for software bundle 106. For example, client management station 112 may send a message to host server 102 (via client management station 112 and Internet 110) requesting to download software bundle 106 for the purpose of updating both Flare $118_2$ (initially) and Flare $118_1$ (or any other storage processor array in network 101).

In block 306, the software package is loaded on a client machine. In one embodiment, client management station 112 begins uploading a requested software bundle 106 to storage processor $114_2$ (e.g., if storage processor $114_1$ is the primary storage processor). In another embodiment, software bundle 106 may be uploaded to storage processor $114_1$, which in turn may load bundle 106 onto storage processor $114_2$. Upon loading bundle 106, storage processor $114_2$ may extract software packages $108_{1...3}$ from software bundle 106.

In block 308, a non-disruptive upgrade (NDU) module extracts installation files. An NDU module (e.g., NDU module $120_2$) may be embodied as a software program that is responsible for initiating the update process for Flare 118. For example, NDU module $120_2$ accesses a package in software bundle 106 and utilizes a static TOC file 204, a script file 210, a script module 214 and an executable file 212. In one embodiment, script module 214 may comprise a collection of functions that is common to the software bundle 106 and is utilized by each of the script files respectively associated with the software packages.

In block 310, the script file is executed. In one embodiment, NDU module $120_2$ initiates and runs script file 210 in software package $108_1$.

In block 312, the hardware platform type is determined. In one embodiment, script file 210 sends a query to storage processor $114_2$ in order to determine the hardware platform type. For example, script file 210 may send a query to determine if the storage processor $114_2$ may be classified a "small platform", a "middle platform", or a "large platform." In response, storage processor $114_2$ provides the platform type information to script file 210.

Figure 6:
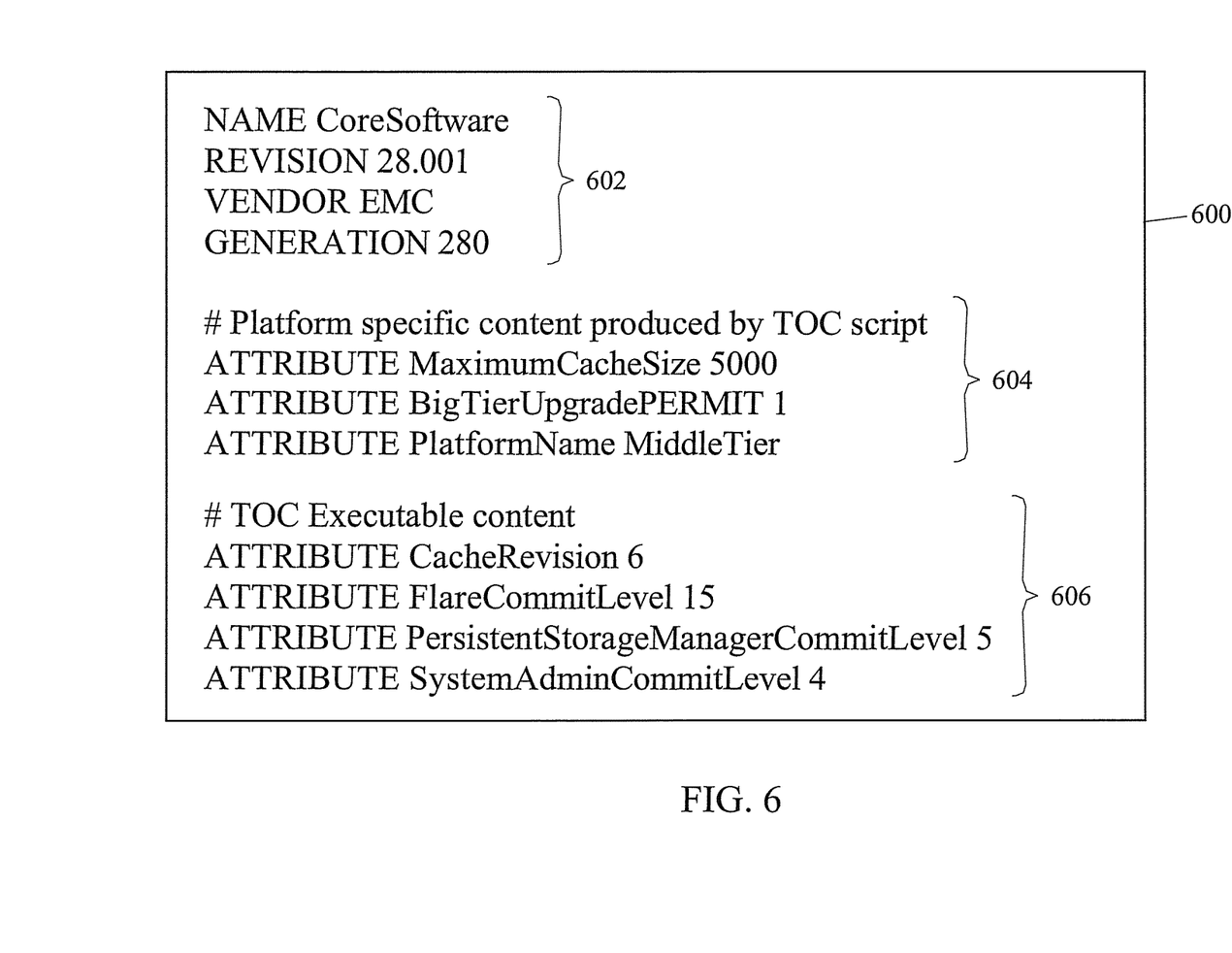
FIG. 6 depicts an exemplary software description file that is dynamically modified according to an embodiment of the subject matter described herein.

In block 314, variable platform description data is appended to the TOC file. In one embodiment, script file 210 utilizes the platform type information received from storage processor 114 in order to properly select the correct attribute data from variable platform description data structure 500. Namely, the correct attribute data is contained in one of the attribute sections 502-506. For example, if script file 210 determines that storage processor $114_2$ is a "middle platform" class, then script file 210 selects section 504. Script file 210 may then append the attribute data contained in section 504 to the TOC file 204. FIG. 6 depicts an exemplary TOC file 600 (i.e., which is also represented as TOC file 204 in FIG. 2) and its components in greater detail. For example, TOC file 600 includes a static section 602, a platform specific content section 604, and a TOC executable content section 606. Notably, section 604 now contains a copy of the attribute data located in section 504 of variable platform description data structure 500 (as shown in FIG. 5).

Returning to FIG. 3, in block 315, a determination is made as to whether an executable file can be located. In one embodiment, script file 210 searches for an executable file in software package 108. If an executable file is found, method 300 continues to block 316. Otherwise method 300 proceeds to block 322. Notably, software package 108 may or may not include an executable file 212 depending on the type of update or modification software package 108 is created to achieve.

In block 316, an executable file is initiated. In one embodiment, script file 210 locates and runs executable file 212. For example, script file 210 may provide the platform type information received from storage processor $114_2$ as input to executable file 212.

In block 318, the executable file processes the platform type information. In one embodiment, executable file 212 processes the platform type information provided by script file 210 and locates the appropriate executable content data (e.g., #define values) as attribute data in variable executable content data structure 400 (as shown in FIG. 4). For example, if executable file 212 is provided with data that indicates storage processor $114_2$ is classified as a "middle platform," then executable file 212 selects section 404.

Figure 7:
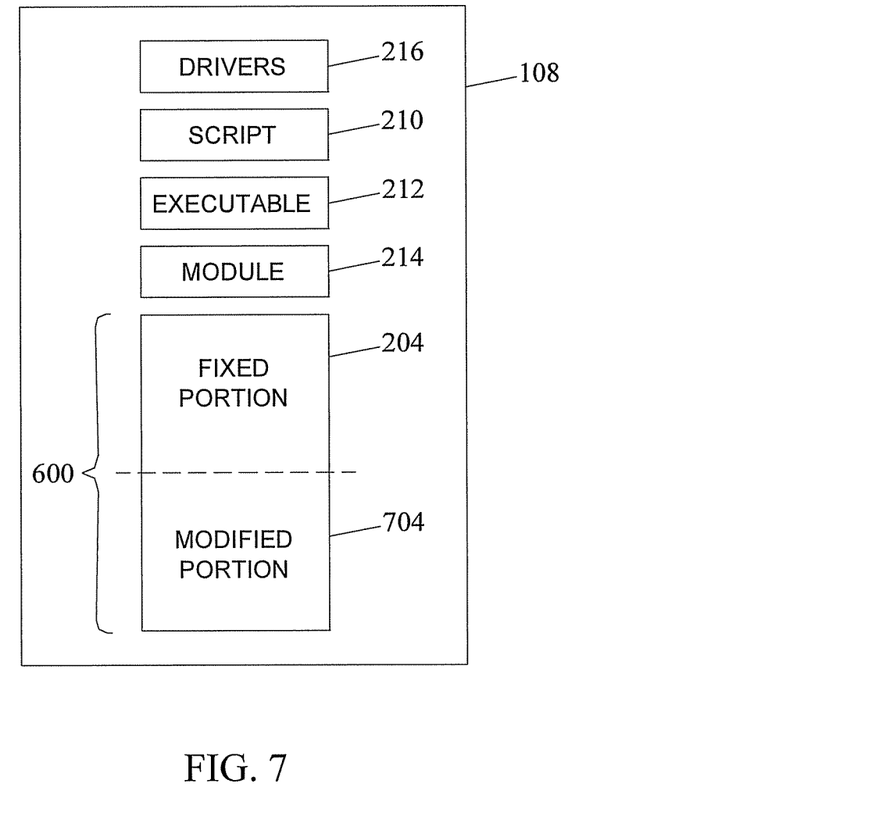
FIG. 7 is a block diagram illustrating an exemplary software package including a dynamically modified software description file according to an embodiment of the subject matter described herein.

In block 320, the executable content data is appended to the TOC file. In one embodiment, script file 210 appends the executable content data (e.g., #define values) designated by executable file 212 to TOC file 600. The executable content data section is shown as section 606 in FIG. 4. At this point, a modified TOC file 600 is now "created" (i.e., sections 604 and 606 have been appended to section 602). The dynamic modification of TOC file 204 in also depicted in FIG. 7. For example, FIG. 7 depicts software package 108 with a modified TOC file 600. Specifically, modified TOC file 600 comprises a fixed portion 204 and a modified portion 704. Fixed portion 204 was previously represented as the original TOC file 204 in FIG. 2, and remains unchanged. However, the modified TOC file 600 now includes modified portion 704, which represents the attribute data appended by script file 210 and executable file 212, respectively.

Returning to FIG. 3, in block 322, the modified TOC file 702 is used to install the software package. In one embodiment, NDU module $120_2$ uses the modified TOC file to install the software package onto storage processor $114_2$. For example, NDU module 120 may compare values in the modified TOC file with values in the existing TOC in Flare 118 in order to determine what, if any, operational actions should be performed depending on the comparison. This is explained below in greater detail. In addition, if storage processor $114_2$ is operating properly after the installation process is complete, primary storage processor $114_1$ then loads the data on itself and repeats the installation procedure mentioned above.

As mentioned above, NDU module 120 utilizes the dynamically modified TOC file 702 to install the software drivers onto a storage processor 114. In one embodiment, NDU module 120 compares the attributes in modified TOC file 702 to either the attributes set forth in a pre-existing TOC file in Flare 118 or the current state of the two storage processors $114_{1-2}$. By comparing attribute and property values with a pre-existing TOC file or the current state of the two storage processors $114_{1-2}$, NDU module 120 is able to determine what operational actions need to be performed during the installation process. For example, NDU process may compare the maximum cache size values (e.g., in section 604 in FIG. 6) to the current amount of cache being used. If the cache size limit on the modified TOC file 600 is smaller than the cache size currently being used, then the cache will need to be disabled during the installation process. Similarly, other operations such as rebooting the storage processor, temporarily downgrading protection (in order to accommodate certain revision levels), and the like may also be conducted by comparing attribute values.

It will be understood that various details of the invention may be changed without departing from the scope of the invention. Furthermore, the foregoing description is for the purpose of illustration only, and not for the purpose of limitation.

What is claimed is:

1. A method for installing a software package on a hardware platform, the method comprising:
loading a software package that includes a software description file on a hardware platform, wherein the software package includes a plurality of attribute information sections corresponding to a plurality of hardware platform types;
determining a hardware platform type from among the plurality of hardware platform types that is associated with the hardware platform;
dynamically modifying the software description file based on the software package and the hardware platform, wherein the software description file is modified by selecting an attribute information section that corresponds to the determined hardware platform type from the software package and appending the selected attribute information section to the software description file, and wherein appending the selected attribute information section includes appending a portion of variable platform description data and a portion of executable content data structure to the software description file, wherein each of the portions is associated with the determined hardware platform type; and
utilizing the modified software description file and the one of the plurality of appended attribute information section to install the software package on the hardware platform, wherein utilizing the modified software description file include comparing the modified description file to a preexisting software description file on the hardware platform to determine whether to perform at least one operational action during the installation process.

2. The method of claim 1 wherein the software description file includes a table of contents (TOC) file.

3. The method of claim 1 wherein the software package includes a script file, an executable file, and the software description file.

4. The method of claim 1 wherein the at least one operational action includes at least one of: rebooting the hardware platform; disabling a cache memory on the hardware platform; and downgrading software protection.

5. A system for installing a software package on a hardware platform, the system comprising:
a host server for storing at least one software package that includes a software description file;
a hardware platform for receiving the at least one software package; and
a software installer for loading the at least one software package on the hardware platform, wherein the software package includes a plurality of attribute information sections corresponding to a plurality of hardware platform types, determining a hardware platform type from among the plurality of hardware platform types that is associated with the hardware platform, dynamically modifying the software description file based on the software package and the hardware platform, wherein the software description file is modified by selecting an attribute information section that corresponds to the determined hardware platform type from the software package and appending the selected attribute information section to the software description file, wherein appending the selected attribute information section includes appending a portion of variable platform description data and a portion of executable content data structure to the software description file, wherein each of the portions is associated with the determined hardware platform type, and utilizing the modified software description file and the one of the plurality of appended attribute information section to install the software package on the hardware platform, wherein utilizing the modified software description file include comparing the modified description file to a preexisting software description file on the hardware platform to determine whether to perform at least one operational action during the installation process.

6. The system of claim 5 wherein the software package includes a script file, an executable file, and the software description file.

7. The system of claim 5 wherein the at least one operational action includes at least one of: rebooting the hardware platform; disabling a cache memory on the hardware platform; and downgrading software protection.

8. The system of claim 5 wherein the software description file includes a table of contents (TOC) file.

9. The system of claim 5 wherein the software installer includes a non-disruptive upgrade module.

10. A non-transitory computer readable medium having stored thereon computer executable instructions that when executed by a processor of a computer performs steps comprising:

loading a software package that includes a software description file on a hardware platform, wherein the software package includes a plurality of attribute information sections corresponding to a plurality of hardware platform types;

determining a hardware platform type from among the plurality of hardware platform types that is associated with the hardware platform;

dynamically modifying the software description file based on the software package and the hardware platform, wherein the software description file is modified by selecting an attribute information section that corresponds to the determined hardware platform type from the software package and appending the selected attribute information section to the software description file, and wherein appending the selected attribute information section includes appending a portion of variable platform description data and a portion of executable content data structure to the software description file, wherein each of the portions is associated with the determined hardware platform type; and utilizing the modified software description file and the one of the plurality of appended attribute information section to install the software package on the hardware platform, wherein utilizing the modified software description file include comparing the modified description file to a preexisting software description file on the hardware platform to determine whether to perform at least one operational action during the installation process.

11. The non-transitory computer readable medium of claim 10 wherein the at least one operational action includes at least one of: rebooting the hardware platform; disabling a cache memory on the hardware platform; and downgrading software protection.

* * * * *